United States Patent [19]

Estes et al.

[11] 4,102,114
[45] Jul. 25, 1978

[54] COMBINATION LEVEL ADJUST AND SELF-TENSIONING BELT ASSEMBLY FOR MOWERS

[75] Inventors: Larry A. Estes, New Palestine; Gerald D. Williams, Indianapolis, both of Ind.

[73] Assignee: The Toro Company, Minneapolis, Minn.

[21] Appl. No.: 713,252

[22] Filed: Aug. 10, 1976

[51] Int. Cl.² .................................................. A01D 35/26
[52] U.S. Cl. ................................. 56/15.2; 56/15.3; 56/15.8; 56/16.3; 56/DIG. 22
[58] Field of Search ............... 56/15.1, 15.2, 15.8, 56/15.9, 17.1, 13.6, 15.3, 16.3, 11.6, DIG. 22; 74/491

[56] References Cited

U.S. PATENT DOCUMENTS

| | | | |
|---|---|---|---|
| 2,972,850 | 2/1961 | Ariens et al. | 56/15.8 |
| 3,199,276 | 8/1965 | Hahn | 56/15.8 |
| 3,680,292 | 8/1972 | McCanse | 56/15.8 |
| 3,910,016 | 10/1975 | Saiia et al. | 56/15.3 |

Primary Examiner—Jay N. Eskovitz
Attorney, Agent, or Firm—Schmidt, Johnson, Hovey & Williams

[57] ABSTRACT

An implement for a tractor is provided with a height adjusting mechanism, including a control lever swingable in a horizontal plane about a fixed vertical axis and operably coupled with an articulate linkage for translating the horizontal swinging of the lever to vertical movement of the implement without creating a force moment thereacross. The articulate linkage spans a pivotal coupling between the main frame of the implement and a mounting bracket secured to the tractor such that the linkage operates to swing the bracket and frame toward and away from one another causing the pivotal coupling to move up and down. A belt drive on the implement is maintained in constant, substantially uniform tension by a shiftable idler pulley operably coupled with the control lever for automatic belt-tension adjustment in response to raising and lowering of the implement.

11 Claims, 7 Drawing Figures

COMBINATION LEVEL ADJUST AND SELF-TENSIONING BELT ASSEMBLY FOR MOWERS

This invention relates to tractor-mounted implements and particularly concerns a belt-powered implement having a height adjustment mechanism swingable in a horizontal plane and coupled with a belt-tensioning device for maintaining constant tension in the belt drive as the implement is raised and lowered. While the present invention relates to tractor-mounted implements in general, the principles thereof are particularly applicable to mower implements used in conjunction with small, garden-type tractors.

Mower implements having height adjustment mechanisms are well-known in the art and typically comprise a linkage for raising and lowering the mower deck coupled to a vertically extending control lever which is shiftable about a horizontal axis to actuate the lifting mechanism. While such mechanisms have proved satisfactory in operation, it may be desirable for safety and convenience to provide a height adjustment control lever which is swingable in a horizontal rather than a vertical plane.

An implement having a horizontally swingable control lever for a height adjustment mechanism is disclosed in U.S. Pat. No. 3,680,292, issued Aug. 1, 1972, and entitled "Mower Implement For Garden Tractor". The implement disclosed in this patent comprises a forwardly supported main frame pivotally coupled with a rearwardly, pivotally supported bracket to present a toggle-linkage arrangement. The toggle linkage is operated by a transversely extending torsion bar coupled with a horizontally swingable control arm to raise and lower one end of the frame in response to swinging of the control arm. However, under certain operating conditions, the torsion bar linkage may create an undesirable force moment across the mower deck. See also U.S. Pat. No. 3,757,596.

Mowers and other belt-driven implements having height adjustment controls have also exhibited operating problems due to variations in belt tension when the implement is raised and lowered. In this connection, since the driving pulley for the belt drive is positioned on the tractor and shifts relative to the implement as the latter is moved up and down by the height adjustment mechanism, large changes in the operating length of the belt occur as the implement is raised and lowered. Take-up means to maintain belt tension through all levels of height adjustment have heretofore comprised spring-loaded, swingable idler pulleys or other yieldable structure. Additionally, some implements are provided with manually adjustable idler pulleys which may be releasably secured in any one of a number of operating positions in response to changes in belt tension. However, spring-loaded, shiftable idler pulleys have proved incapable of adequately compensating for the large changes in operating length of the drive belt due to vertical height adjustment of the implement, and adjustable idler pulleys have proved ineffective due to the extremely inconvenient procedure of manually repositioning the pulley after each height change for the implement.

Accordingly, it is an important object of the present invention to provide a tractor-carried implement with height adjustment mechanism having a control arm swingable in a horizontal plane abour a fixed vertical axis for raising and lowering a portion of the implement without creating undesirable force moments across the latter.

It is another important object of our invention to provide an implement as above with a belt drive having belt tensioning means operably coupled to the control arm for automatically adjusting the belt tension in response to vertical movement of the implement.

It is yet another important object of the instant invention to provide an implement having a forwardly supported main frame pivotally coupled at its rear end to a mounting bracket which may be shiftably secured to a tractor and articulated linkage extending between the bracket and the frame for swinging movement of the bracket and frame toward and away from one another to effect up-and-down movement of the rear end of the frame.

As a corollary to the above object, it is another important object of the present invention to provide an adjustable link for the linkage extending between the bracket and frame whereby the motion imparted by the linkage to the rear end of the frame may be varied.

Figure 1:
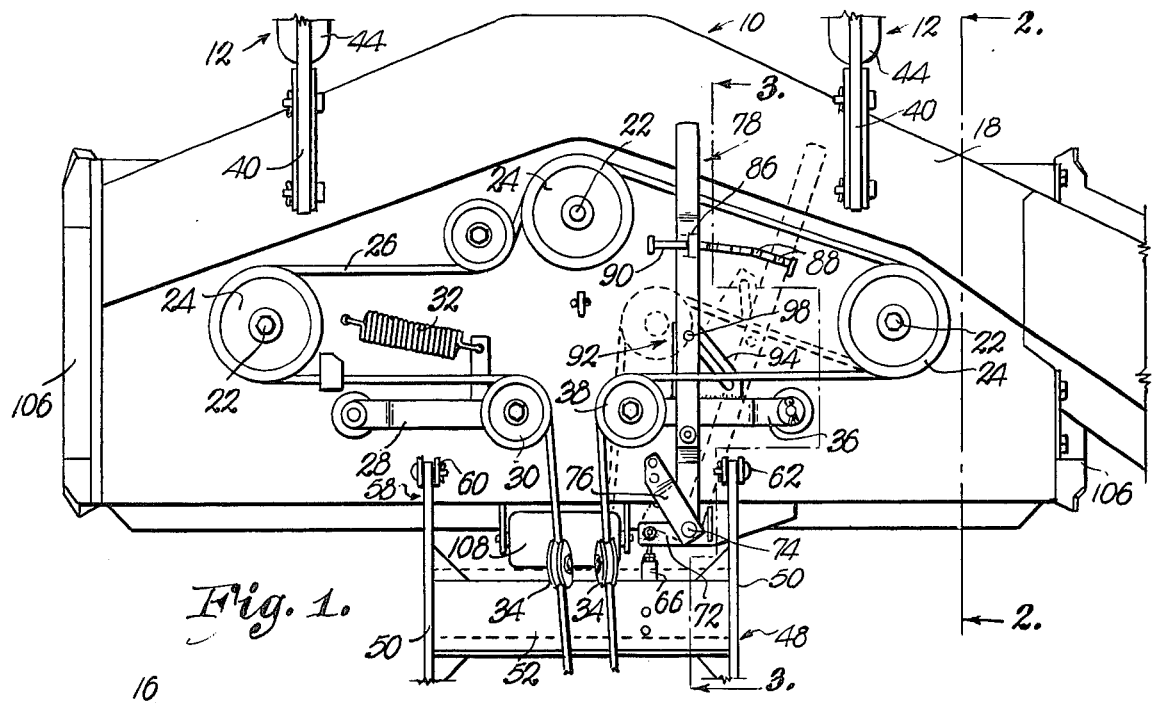
FIG. 1 is a partial plan view, showing an implement constructed in accordance with the principles of the present invention.

Turning now to the drawings, a mowing implement 10 is shown forwardly supported by a pair of ground-engaging gauge wheels 12 and rearwardly supported adjacent the axle 14 of a tractor 16. It is to be understood that implement 10 is shown as a mowing device only for the purpose of illustration and that the principles of the present invention may be applied to any belt-driven implement requiring height adjustment.

Implement 10 includes a generally triangular main frame or deck 18 which supports virtually all of the working elements of the implement 10. Three elongate cutter blades 20 (only one being shown) are rotatably carried in triangularly spaced relationship beneath deck 18 by respective drive shafts 22 which extend vertically through deck 18 and are journaled thereto. Each drive shaft 22 is provided with a drive pulley 24 at the upper end thereof for entrainment by a drive belt 26 adapted to engage a drive mechanism (not shown) on the tractor 16. A pivot arm 28 mounted on the upper surface of deck 18 carries an idler pulley 30 adapted to engage belt 26 for the purpose of maintaining constant tension therein. To augment its tensioning function, pulley 30 is biased against belt 26 by a coil spring 32 extending from arm 28 to an anchor point on deck 18. A pair of guide pulleys 34 are positioned at the rear end of deck 18 to provide a transition for belt 26 from its attachment with the drive mechanism on tractor 16.

Further belt-tensioning structure is provided in the form of a second pivot arm 36 mounted on deck 18 for swinging movement in a horizontal plane and having an idler pulley 38 rotatably carried on one end thereof.

Idler pulley 38 is shiftable toward and away from belt 36 by virtue of its connection with a linkage to be described hereinbelow.

The castoring gauge wheels 12 mounted on the front end of deck 18 each comprise a forwardly extending support bar 40 having a bifurcated wheel mount 42 pivotally secured to the forward-most end thereof. Each mount 42 supports a tire 44 between the forks thereof for rotation upon an axle 46.

The mowing implement 10 is of segmented construction having a forward segment in the form of deck 18 pivotally coupled to a rearward segment in the form of a mounting bracket 48. Bracket 48 comprises essentially a pair of parallel, laterally spaced beams 50 rigidly interconnected by a transversely extending crosshead 52. The rearmost end of bracket 48 is shiftably secured to tractor 16 through connection with a hitch 54 of conventional construction. The hitch 54 mounts the rear end of bracket 48 in such a manner that the latter is pivotal about a horizontal axis 56.

A coupling 58 pivotally connects the rear end of deck 18 with the forward end of bracket 48 to permit swinging movement between bracket 48 and deck 18 toward and away from one another about a substantially horizontal, transverse axis. Coupling 58 includes two spaced sets of ears 60 projecting upwardly from deck 18; each set of ears 60 cradles one end of a respective beam 50 and is pivotally secured thereto by a retaining pin 62.

At this point, it is important to understand that the overall arrangement of implement 10 defines a toggle linkage which includes a forward link represented by deck 18 supported for up and down pivotal movement about the axles 46 of the wheels 12 and a rear link represented by bracket 48 supported for up and down pivotal movement about axis 56 of hitch 54. Coupling 58 completes the toggle linkage arrangement in the implement 10 by pivotally joining deck 18 and bracket 48. Because of the toggle linkage arrangement, coupling 58, and consequently the rear end of deck 18, may be raised and lowered by merely swinging bracket 48 and deck 18 toward and away from one another about the pivotal axis of coupling 58. In other words, vertically buckling and unbuckling the toggle about pins 62 raises and lowers the rear of deck 18.

Figure 4:
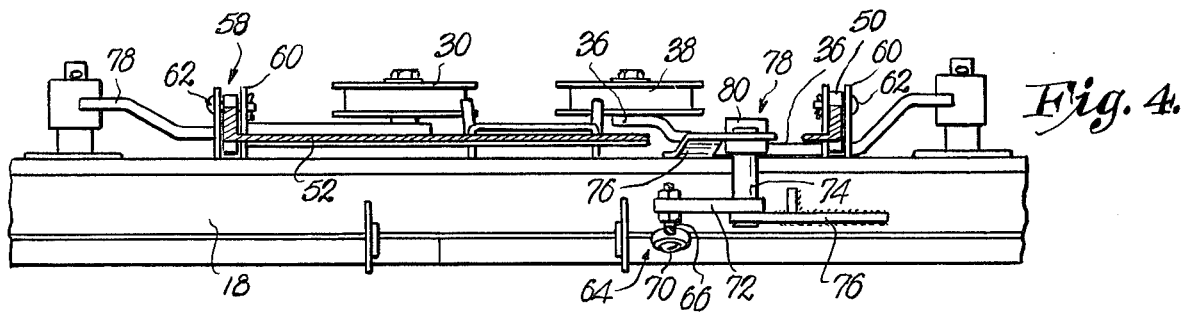
FIG. 4 is an enlarged, partial, cross-sectional view taken along line 4—4 of FIG. 3.

For the purpose of raising and lowering coupling 58, an articulated linkage 64 is provided which extends beteen bracket 48 and deck 18. Linkage 64 comprises an elongate extensible link 66 pivotally secured at one end to crosshead 52 by a ball and socket fastener 68 and coupled at the opposite end by a similar ball and socket fastener 70 to the other end of a short crank link 72. The inner end of link 72 is rigidly secured to an upright shaft 74 journaled in upper and lower support structure 76 (detailed in FIG. 4) on the deck 18 for swinging movement about a substantially vertical axis. Linkage 64 forms the working portion of the height adjustment mechanism and, as viewed in FIG. 1, clockwise movement of crank link 72 about the axis of shaft 74 causes coupling 58 and the rear end of deck 18 to move vertically upward; whereas, conversely, counterclockwise movement of crank link 72 about the axis of shaft 74 causes coupling 58 and the rear end of deck 18 to move vertically downward. Link 66 is oblique to the plane of swinging movement for crank 72 such that linkage 64 is non-coplanar.

The height adjustment mechanism is provided with control means in the form of an elongate lever 78 rigidly secured to shaft 74 for swinging movement in a substantially horizontal plane about the vertical axis of shaft 74. The rigid connection between lever 78 and shaft 74 also serves to operably couple the lever 78 with crank line 72 such that swinging movement of the lever 78 causes actuation of linkage 64 to raise and lower the rear end of deck 18 adjacent coupling 58. In this manner, the desired height of deck 18 may be controlled by merely swinging lever 78 in a horizontal plane.

For convenience of construction, lever 78 is formed in two pieces having a rear section 80 rigidly secured to a forward section 82 by bolt assembly 84. Forward section 82 has a relief 86 to permit the lever 78 to be selectively recieved within any one of a plurality of notches 88 formed in an arcuate retaining bar 90 on deck 18 whereby further swinging movement of lever 78 is restrained. It should be understood that while the lever 78 is of rigid construction, it may nevertheless be deflected a small amount in the vertical direction such that the relief 86 may be selectively engaged by notches 88 on bar 90. By this arrangement lever 78 may be swung to a position corresponding to the desired height of implement 10 whereupon relief 86 is placed in engagement with a notch 88 on bar 90 to preclude further movement of lever 78.

Lever 78 is also operably connected with the above-described belt-tensioning structure by a slider connection 92. Connection 92 comprises a triangular plate 94 rigidly secured to pivot arm 36 for swinging movement therewith and having an elongate slot 96 formed therein for captively receiving a guide pin 98 depending from lever 78. As seen in FIG. 1, connection 92 is so arranged that when lever 78 is swung clockwise to effect vertical upward movement of the rear end of deck 18, pivot arm 36 will also be swung clockwise moving idler pulley 38 inwardly against belt 26 to take up slack in the belt caused by raising the rear end of the deck 18. Conversely, when lever 78 is swung counterclockwise to cause lowering of the rear end of deck 18, pivot arm 36 will also be caused to swing counterclockwise, thereby moving pulley 38 away from belt 26 and increasing the effective length of the latter to allow for the increased distance between the rear end of deck 18 and the drive pulley on tractor 16.

The lifting and support functions of the height control mechanism in cooperation with gauge wheels 12 and hitch 54 are augmented somewhat by a link chain 100 which extends between deck 18 and a crank 102 on tractor 16. A hydraulic cylinder assembly 104 operates to swing crank 102 for raising and lowering deck 18. In the normal operating position, chain 100 is slack such that all of the weight of implement 10 is supported by gauge wheels 12 and hitch 54.

In order to avoid scalping the turf or damage to blades 20 when the implement 10 is operated in very rough terrain, deck 18 is provided with a pair of protective skids 106 at opposite sides thereof and a rearwardly supported ground roller 108.

Figure 5:
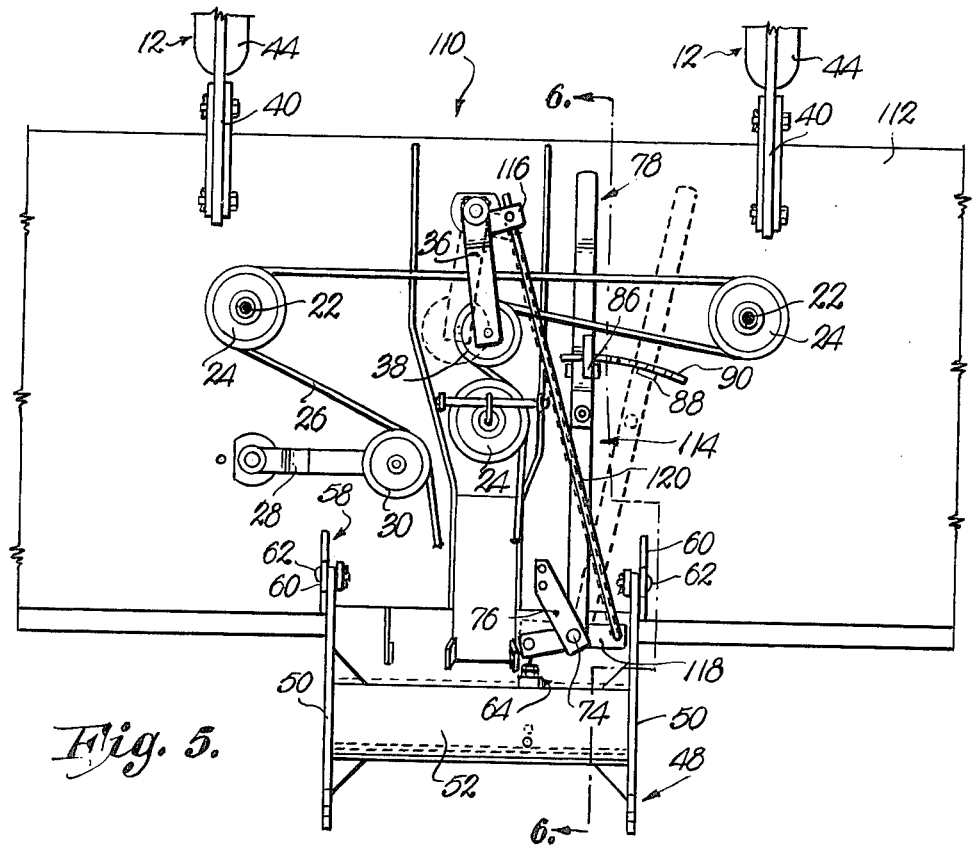
FIG. 5 is a partial, plan view of a second embodiment of the present invention.
Figure 6:
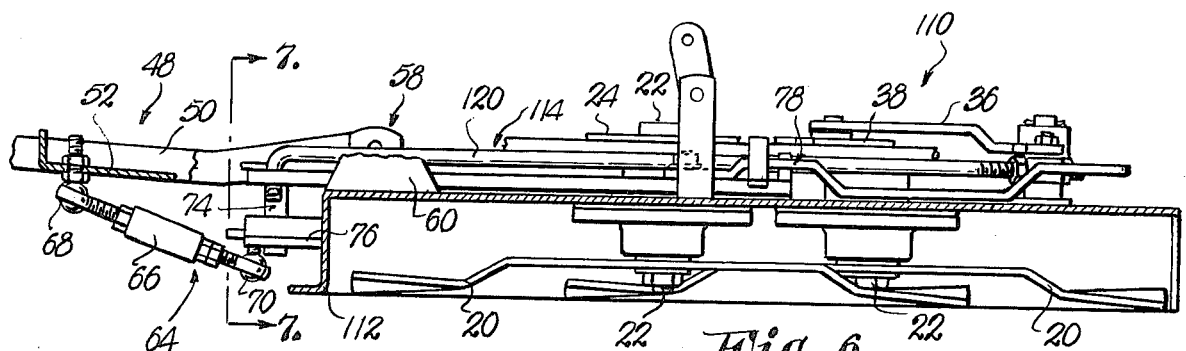
FIG. 6 is an enlarged, partial, cross-sectional view taken along line 6—6 of FIG. 5.
Figure 7:
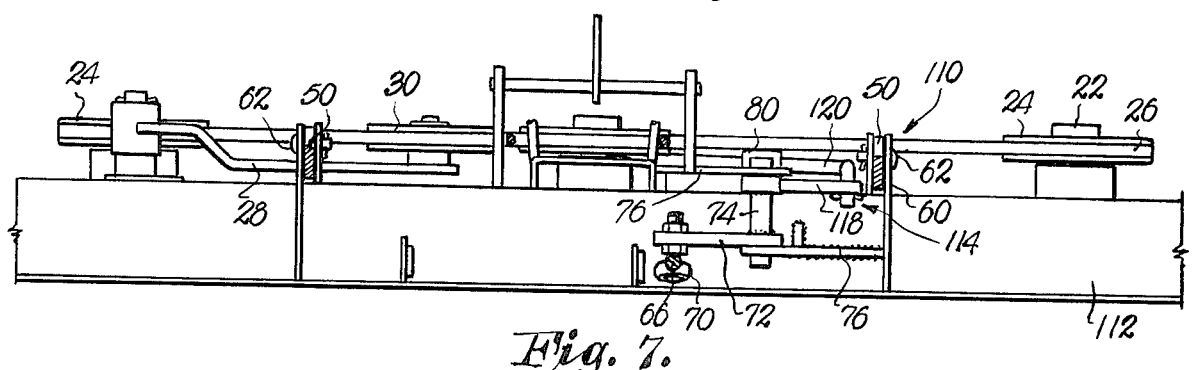
FIG. 7 is an enlarged, partial, cross-sectional view taken along line 7—7 of FIG. 6.

A second embodiment of the present invention is shown in FIGS. 5–7 and is substantially the same as the first embodiment with a few exceptions to be described hereinbelow. One apparent difference is that the mowing implement 110 has a rectangular deck 112 as opposed to the triangular shape of deck 18.

The arrangement of drive pulleys 24 and their corresponding cutter bars 20 is somewhat different than that shown for the implement 10 although there remains three such pulleys 24 and the cutter blades 20 are still arranged for cutting overlapping swaths.

A notable distinction between implement 10 and implement 110 is that the function of slider connection 92 of implement 10 is performed in implement 110 by a connecting linkage 114. Linkage 114 comprises essentially a crank arm 116 rigidly secured to pivot arm 36, a second crank arm 118 rigidly secured to shaft 74 for rotation therewith, and a connecting rod 120 extending between, and pivotally secured to, crank arms 116 and 118. As shown in FIG. 5, connecting linkage 114 is so arranged that clockwise movement of lever 78 causes clockwise movement of pivot arm 36 whereby idler pulley 38 moves against belt 26 to take up slack in the belt introduced by raising the rear end of deck 112. In a converse manner, counterclockwise movement of lever 78 causes counterclockwise movement of pivot arm 36 to thereby move idler pulley away from belt 26 permitting an increase in the effective length thereof to compensate for lowering of the rear end of deck 112.

Figure 2:
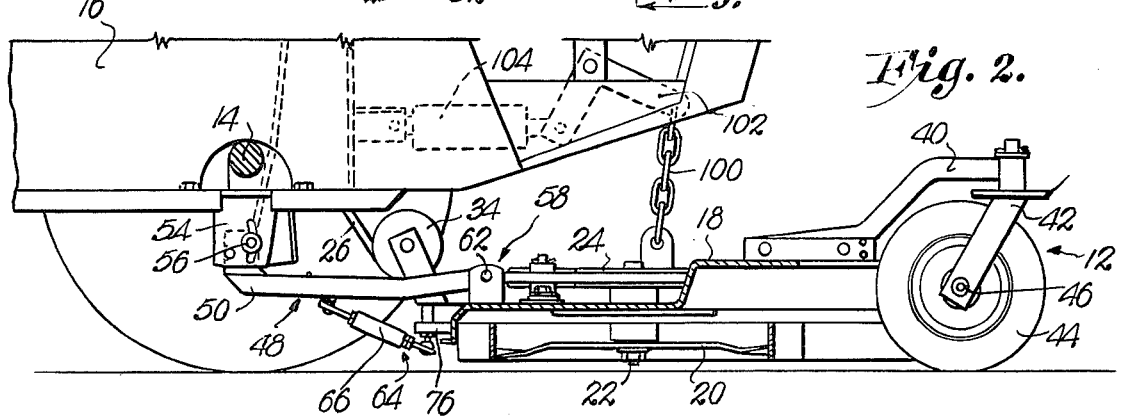
FIG. 2 is a partial, cross-sectional view taken along line 2—2 of FIG. 1.
Figure 3:
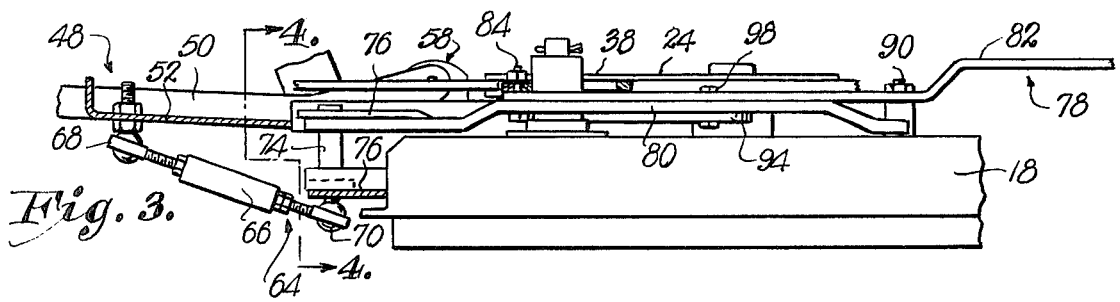
FIG. 3 is an enlarged, partial, cross-sectional view taken along line 3—3 of FIG. 1.

In operation, mowing implement 10 is supported from tractor 16 in a manner substantially as shown in FIG. 2. The operator sets the desired cutting height by merely swinging lever 78 to a position corresponding to the desired height of the rear end of deck 18. With the lever 78 in this position, relief 86 is placed in engagement with a corresponding notch 88 on bar 90 to positively lock the vertical position of deck 18. The proper tension in belt 26 is automatically set by operation of slider connection 92 to properly position idler pulley 38.

With the implement 10 in the desired position, the operator simply drives tractor 16 across the grassy area to be mowed. Terrain changes encountered by the implement 10 are compensated for by gauge wheels 12 as well as vertical movement of the implement through hitch 54; the implement 10 is protected against severe ground changes by the side-mounted skids 106 and the rear ground roller 108.

Should it be desired to reset the cutting height, the operator merely repositions lever 78 to a new position corresponding to the desired cutting height. For example, if the operator desires to increase the cutting height, he simply moves lever 78 in a clockwise direction as viewed in FIG. 1. As previously described, this swinging movement causes crank link 72 of linkage 64 to also move in a clockwise direction whereby bracket 48 and deck 18 are swung toward one another about their pivotal connection at the pins 62 of coupling 58. Since bracket 48 is supported for swinging movement about a horizontal axis 56 at hitch 54 and deck 18 is supported for swinging movement about a horizontal axis 46 on gauge wheels 12, an action in the nature of a toggle linkage is created whereby coupling 58 is caused to move upwardly in response to actuation of linkage 64.

In addition to raising the rear end of deck 18, clockwise movement of lever 78 simultaneously repositions idler pulley 38 to take up slack in belt 26 introduced by the new position of implement 10 relative to the drive pulley on tractor 16. This repositioning takes place automatically through the operation of slider connection 92 which swings pivot arm 36 in response to swinging movement of the lever 78.

To accomplish initial movement of lever 78 when making height adjustments to mowing implements 10, the operator must first slightly deflect the forward section 82 upwardly to disengage relief 86 from a respective notch 88 on retaining bar 90. With the forward section 82 in this slightly deflected position, lever 78 may readily be swung to any desired position along retaining bar 90. To lock the height adjustment control at any desired height, the operator merely allows the forward section 82 to return to its normal position wherein relief 86 will engage an underlying notch 88 on bar 90.

The operation of mowing implement 110 is substantially the same as the operation of mowing implement 10 with the exception of minor details already described hereinabove. Consequently, the general operation of mowing implement 110 need not be further explained.

It is apparent from the above description of structure and operation that the invention herein presents a safe and effective height control mechanism for tractor supported implements and the like. The convenient, horizontally swingable control lever 78 reduces the safety hazards of vertical levers while the articulate linkage 64 combined with the toggle linkage arrangement of bracket 48 and deck 18 permits the horizontal swinging movement of lever 78 to effect raising and lowering of the rear end of deck 18, all without introducing undesirable torque stresses across the implement 10.

Moreover, the provision of an adjustable link such as extensible link 66 presents a means for fine adjustment of the height control mechanism to accurately position the rear end of deck 18 regardless of tolerance buildups or minor field damage to the mowing implement 10. In this connection, should the implement 10 incur minor damage to the effect that the desired height adjustment is no longer available by swinging lever 78 through an arc along bar 90, link 66 may be extended or retracted to once again present a desired height adjustment range for the lever 78.

Additionally, operably coupling the adjustable idler pulley 38 to the height control lever 78 provides an extremely efficient means for ensuring proper belt tension through all height positions of the deck 18. Since the pulley 38 is positively coupled to lever 78 through slider connection 92 (connecting linkage 114 in the second embodiment, the proper belt tension is always maintained. Further, the positive connection between the idler pulley 38 and lever 78 adjusts the belt tension automatically, there being no requirement on the part of the operator to manually adjust the pulley 38.

Thus, there is presented for tractor-mounted implements a convenient, extremely safe, and highly efficient height control mechanism which simultaneously adjusts belt tension in the belt drive on the implement.

Having thus described the invention, what is claimed as new and desired to be secured by Letters Patent is:

1. In an implement adapted for attachment to a tractor and having a main frame ground-supported at one end thereof, height adjustment mechanism including:
   a mounting bracket shiftably secured to said tractor;
   a coupling pivotally interconnecting said bracket and the opposite end of said main frame for relative swinging movement of the frame and the bracket about a substantially horizontal axis;
   linkage extending between said bracket and said frame for swinging said bracket and frame about said horizontal axis toward and away from one another to raise and lower said rear end;
   a lever pivotally mounted on said main frame for swinging movement in a horizontal plane about a fixed vertical axis; and
   means operably coupling said linkage and said lever for raising and lowering said rear end in response to horizontal swinging of said lever.

2. A height adjustment mechanism as claimed in claim 1, wherein said coupling means includes an upright shaft connected to said frame which defines a vertical axis for pivotal movement of said lever, said linkage including a crank secured with respect to said lever, whereby said crank is shifted in response to swinging movement of said lever.

3. A height adjustment mechanism as claimed in claim 2, wherein said linkage includes an extensible link extending between said crank and said bracket.

4. A height adjustment mechanism as claimed in claim 3, wherein said linkage is non-coplanar, with the plane movement of said crank said extensible link having ball and socket pivots at each end thereof.

5. A height adjustment mechanism as claimed in claim 1, wherein said implement has a belt drive, said lever being coupled with a shiftable idler pulley for adjusting belt tension in response to height adjustment.

6. A height adjustment mechanism as claimed in claim 1, wherein a keeper on said frame is adapted to receive and retain said lever in any one of a number of preselected positions.

7. An implement adapted for shiftable mounting on a tractor or the like and having a belt and pulley drive train for coupling with a first driving pulley at a fixed position on the tractor, said implement including:

structure for selectively shifting the position of a second pulley in said belt and pulley drive train with respect to said implement;

height adjustment mechanism for raising and lowering a portion of the implement, whereby the distance between said first pulley and the remainder of said belt and pulley drive train is altered;

linkage means operably interconnecting said structure and said mechanism, for shifting said second pulley by an amount to compensate for alterations in the distance between said first pulley and the remainder of said drive train which occur during height adjusting movement of the implement.

8. An implement as claimed in claim 7, wherein said belt-tensioning structure includes an idler pulley mounted on a swingable arm for movement toward and away from the belt.

9. An implement as claimed in claim 8, wherein said height adjustment mechanism includes a lever swingable in a horizontal plane about a fixed vertical axis.

10. An implement as claimed in claim 9, wherein said connecting means includes a slide pin mounted on said lever and a guard plate carried on said swingable arm and having a slot formed therein for captively receiving said pin.

11. An implement as claimed in claim 9, wherein said connecting means includes a crank fixedly secured with respect to said swingable arm.

* * * * *